United States Patent
Guillen et al.

(10) Patent No.: US 10,452,318 B2
(45) Date of Patent: Oct. 22, 2019

(54) SYSTEMS AND METHODS FOR RECORDING AND PLAYBACK OF MULTIPLE VARIABLE RATE DATA STREAMS

(71) Applicant: MOTOROLA SOLUTIONS, INC., Chicago, IL (US)

(72) Inventors: Adrian Guillen, Miami, FL (US); Joel Hegberg, Lauderhill, FL (US); Chet A. Lampert, Sunrise, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 4 days.

(21) Appl. No.: 15/850,051

(22) Filed: Dec. 21, 2017

(65) Prior Publication Data
US 2019/0196741 A1    Jun. 27, 2019

(51) Int. Cl.
*G06F 3/06* (2006.01)
*G06F 16/16* (2019.01)
*G06F 16/13* (2019.01)

(52) U.S. Cl.
CPC ............ *G06F 3/0659* (2013.01); *G06F 3/067* (2013.01); *G06F 3/0613* (2013.01); *G06F 3/0656* (2013.01); *G06F 16/13* (2019.01); *G06F 16/164* (2019.01)

(58) Field of Classification Search
CPC ...... G06F 3/067; G06F 12/0804; G06F 3/061; G06F 3/0638; G06F 16/1794; G06F 3/0605; G06F 3/0659; G06F 16/164; G06F 16/13; G06F 3/0613; G06F 3/0656
See application file for complete search history.

(56) References Cited

U.S. PATENT DOCUMENTS

| | | |
|---|---|---|
| 6,189,069 B1 | 2/2001 | Parkes et al. |
| 7,162,553 B1 | 1/2007 | Xue et al. |
| 2005/0235080 A1 | 10/2005 | El-Batal |
| 2006/0206635 A1 | 9/2006 | Alexander et al. |

(Continued)

OTHER PUBLICATIONS

Averna, "RP-6100 Multi-Channel RF Record & Playback Products," specifications (2017) 6 pages.

(Continued)

*Primary Examiner* — Zhuo H Li
(74) *Attorney, Agent, or Firm* — Michael Best & Friedrich LLP

(57) ABSTRACT

Systems and methods for recording and playback of multiple data streams. One device includes a storage controller coupled to an electronic storage device, a first data buffer storing data received from a first data stream, a second data buffer storing data received from a second data stream, a fragment buffer storing fragment metadata, a storage buffer including a plurality of data fragments, and an electronic processor. The electronic processor receives information designating a data stream storage area of the electronic storage device. The electronic processor arbitrates between the first and second data buffers to select a data fragment for writing to the storage buffer. The electronic processor writes the data fragment to the storage buffer, and writes fragment metadata defining the data fragment to the fragment buffer. The electronic processor controls the storage controller to sequentially write from the plurality of data fragments to the data stream storage area.

18 Claims, 3 Drawing Sheets

(56) References Cited

U.S. PATENT DOCUMENTS

2014/0101114 A1* 4/2014 Akirav ................ G06F 3/0608
                                                     707/692
2014/0122796 A1   5/2014 DeKoning
2015/0286420 A1  10/2015 Crisman et al.
2017/0220267 A1*  8/2017 Neelakanta ........... G06F 3/0616

OTHER PUBLICATIONS

Motorola Solutions, "NEN 3000-Viper—Supported Applications and Technologies," product data sheet (Dec. 2016) pp. 1-2.
Pentek, "Talon RTR 2738 LVDS Digital I/O Rugged Portable Recorder," website (2017) 3 pages, http://www.pentek.com/products/detail.cfm?model=2738[Dec. 7, 2017 9:26:03 AM].

* cited by examiner

SYSTEMS AND METHODS FOR RECORDING AND PLAYBACK OF MULTIPLE VARIABLE RATE DATA STREAMS

BACKGROUND OF THE INVENTION

Some wireless communication devices operate over a wide range of frequencies, using multiple inputs and outputs across multiple frequencies. Such devices are capable of receiving multiple data streams at variable rates of transmission. Other data streams (for example, user inputs and control signals) are also received by such devices. These data streams may be stored for future playback and analysis.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
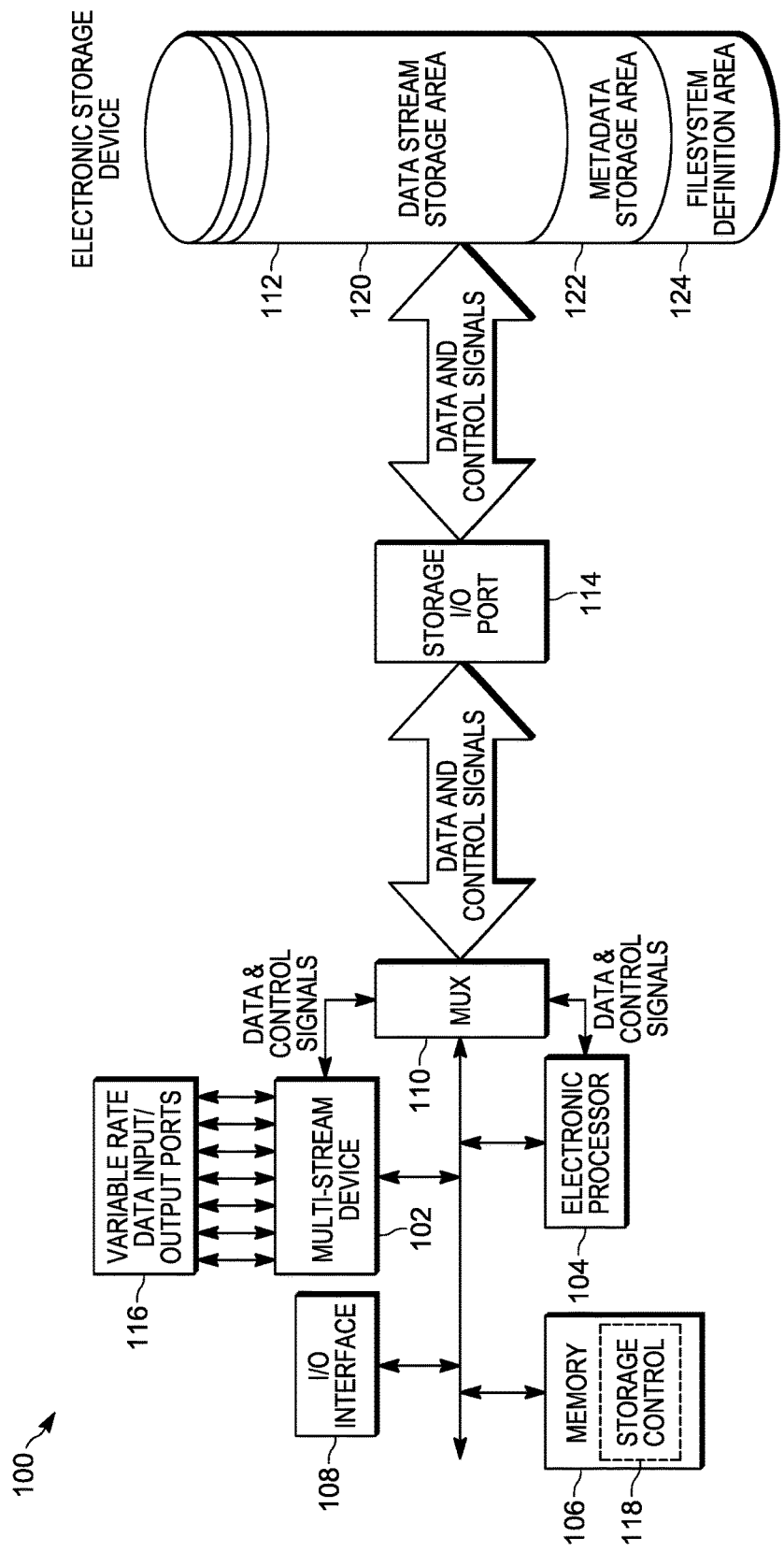
FIG. 1 is a diagram of a system for recording and playback of multiple variable rate data streams, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Radio communication and other computing devices transmit and receive data using modulated radiofrequency signals using a broad range of operating frequencies, channel bandwidths, operating modes, and modulation waveforms. Some devices also use multiple inputs and outputs, multiple channels, and multiple operating modes. As a consequence, such devices receive large amounts of data via multiple data streams at variable rates. In some situations, it is desirable to record this data for later use. For example, multiple data, voice, and video streams relating to a public safety incident may need to be stored for playback during later investigation of the incident. In another example, a simultaneous wideband radiofrequency survey may produce multiple data streams at different data rates. Such data streams are stored for later in-depth analysis during production of the radiofrequency survey.

Storing data in file systems allows later retrieval of the data without the use of proprietary disk reading hardware or software. However, recording multiple data streams with high data rates into existing file systems requires software intervention to open files, allocate space, and maintain file system structures. This negatively affects system throughput due to increased processor loading, hardware input/output limitations, and file system overhead. Additionally, the fragmentation that occurs in file systems requires random disk writes, and prohibits large sequential writes. Fragmentation and overhead issues also limit playback speeds. Accordingly, systems and methods are provided herein for, among other things, recording and playback of multiple variable rate data streams.

Embodiments presented herein capture and store data streams directly to a storage device nondeterministically without software intervention to improve throughput. Multiple variable rate data streams are received into individual data buffers. Data is pulled from the individual buffers based on a priority and placed in a common buffer to prevent overflow of the individual buffers. This allows data from multiple channels to be written with the same large sequential write, increasing throughput to the storage device. Metadata defining the data pulled from the buffers is written periodically to a dedicated section of the storage device, resulting in low overhead. Following data recording, a file system can be created retroactively using the metadata. Using such embodiments, multiple variable rate data streams can be received and stored at rates near the storage device's maximum throughput. The data streams may be accessed using conventional computing devices and the file system. In addition, the metadata can be used to bypass the file system and allow access to the data streams directly to provide real-time radiofrequency data playback, where the streams are timed and synchronized just as they were recorded.

One example embodiment provides an electronic device for recording multiple data streams. The device includes a storage controller coupled to an electronic storage device, a first data buffer storing data received from a first data stream, a second data buffer storing data received from a second data stream, a fragment buffer storing fragment metadata, a storage buffer including a plurality of data fragments, and an electronic processor. The electronic processor is communicatively coupled to the storage controller, the first data buffer, the second data buffer, the fragment buffer, and the storage buffer. The electronic processor is configured to receive information designating a data stream storage area of the electronic storage device. The electronic processor is configured to arbitrate between the first data buffer and the second data buffer to select a data fragment for writing to the storage buffer. The electronic processor is configured to write the data fragment to the storage buffer. The electronic processor is configured to write fragment metadata defining the data fragment to the fragment buffer. The electronic processor is configured to control the storage controller to sequentially write from the plurality of data fragments of the storage buffer to the data stream storage area of the electronic storage device.

Another example embodiment provides a method for recording multiple data streams. The method includes receiving, with an electronic processor, information designating a data stream storage area of an electronic storage device. The method includes arbitrating between a first data buffer receiving from a first data stream and a second data buffer receiving from a second data stream to select a data fragment for writing to a storage buffer. The method includes writing the data fragment to a plurality of data fragments stored in the storage buffer. The method includes writing fragment metadata defining the data fragment to a fragment buffer. The method includes sequentially writing, with a storage controller, from the plurality of data fragments to the data stream storage area of the electronic storage device.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a diagram of an example system 100 for recording and playback of multiple variable rate data streams. In the embodiment illustrated, the system 100 includes a multi-stream recording and playback device 102, an electronic processor 104, a memory 106, an input/output (I/O) interface 108, and a multiplexer (MUX) 110. The illustrated components of FIG. 1, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

In some embodiments, the system 100 is implemented as a software defined radio (SDR). In some embodiments, the system 100 is a standalone device (for example, the NEN 3000 by Motorola Solutions®). In some embodiments, the system 100 is integrated with an electronic communications device, for example, a portable radio, a cellular telephone, a tablet computer, and the like.

The multi-stream recording and playback device 102, described more particularly below with respect to FIG. 2, and the electronic processor 104 are communicatively coupled to an electronic storage device 112, via the multiplexer 110 and a storage input/output port 114. As described in detail the multi-stream recording and playback device 102 includes hardware and software that enable it to receive multiple variable-rate data streams (for example, via the variable rate data input/output ports 116) and record the data directly to the electronic storage device 112. In some embodiments, the variable rate data input/output ports 116 are radiofrequency (RF) ports for transmitting or receiving data using various radiofrequency modulation schemes (for example, Long Term Evolution (LTE), WiFi, and the like). In some embodiments, the variable rate data input/output ports 116 are ports for transmitting or receiving digital audio, digital video, or both. In some embodiments, the multi-stream recording and playback device 102 receives data streams (for example, keystrokes or other input) from the input/output interface 108.

The electronic processor 104 obtains and provides information (for example, from the memory 106 and/or the input/output interface 108), and processes the information by executing one or more software instructions or modules, capable of being stored, for example, in a random access memory ("RAM") area of the memory 106 or a read only memory ("ROM") of the memory 106 or another non-transitory computer readable medium (not shown). The software can include firmware, one or more applications, program data, filters, rules, one or more program modules, and other executable instructions. The electronic processor 104 is configured to retrieve from the memory 106 and execute, among other things, software related to the control processes and methods described herein.

The memory 106 can include one or more non-transitory computer-readable media, and includes a program storage area and a data storage area. The program storage area and the data storage area can include combinations of different types of memory, as described herein. In the embodiment illustrated, the memory 106 stores, among other things, storage control software 118. The electronic processor 104 executes the storage control software 118 to control the electronic storage device 112 (for example, to read data, write data, and create file systems).

The input/output interface 108 is configured to receive input and to provide output to peripherals. The input/output interface 108 obtains information and signals from, and provides information and signals to, (for example, over one or more wired and/or wireless connections) devices both internal and external to the system 100.

The multiplexer 110 is controllable (for example, by the electronic processor 104) to switch the storage input/output port 114 between the multi-stream recording and playback device 102 and the electronic processor 104. The electronic storage device 112 is a non-transitory computer-readable medium. In some embodiments, the electronic storage device 112 is a hard drive or solid state drive (SSD). In some embodiments, the electronic storage device 112 includes a Serial Advanced Technology Attachment (SATA) interface (not shown). In such embodiments, the storage input/output port 114 is an external SATA (eSATA) port.

As described in detail below, in some embodiments, the electronic storage device 112 is divided into three areas: a data stream storage area 120, a metadata storage area 122, and a file system definition area 124. For ease of description, FIG. 1 illustrates the data stream storage area 120, the metadata storage area 122, and the file system definition area 124 of the electronic storage device 112 as separate contiguous areas, arranged one after the other. In some embodiments, one or more of the storage areas 120, 122, 124 of the electronic storage device 112 include multiple locations or areas, which are spread throughout the electronic storage device 112, and may not appear in any particular order. The data stream storage area 120 stores data fragments from data streams received and processed by the multi-stream recording and playback device 102. The metadata storage area 122 stores metadata that describes the data fragments stored in the data stream storage area 120. The file system definition area 124 is used by the electronic processor 104 to store data defining a file system on the electronic storage device 112, which allows standard file access to the electronic storage device 112 by various computer operating systems. In some embodiments, the electronic processor 104 uses the storage control software 118 to perform a survey of the electronic storage device 112. The survey scans the electronic storage device 112 and identifies unused areas, which may be used as the data stream storage area 120 and the metadata storage area 122. The survey also identifies the file system definition area 124 (areas of the electronic storage device 112 that are reserved for the file system). In some embodiments, the survey identifies the file system definition area 124 as one or more locations on the electronic storage device 112 that the multi-stream recording and playback device 102 must skip as it is writing data to the electronic storage device 112.

The electronic processor 104, the memory 106, the input/output interface 108, the multiplexer 110, the electronic storage device 112, the storage input/output port, and the variable rate data input/output ports 116 may include various digital and analog components, which for brevity are not described herein and which may be implemented in hardware, software, or a combination of both. In some embodiments, the multi-stream recording and playback device 102 is not integrated with the other components of the system 100 into a single device.

Figure 2:
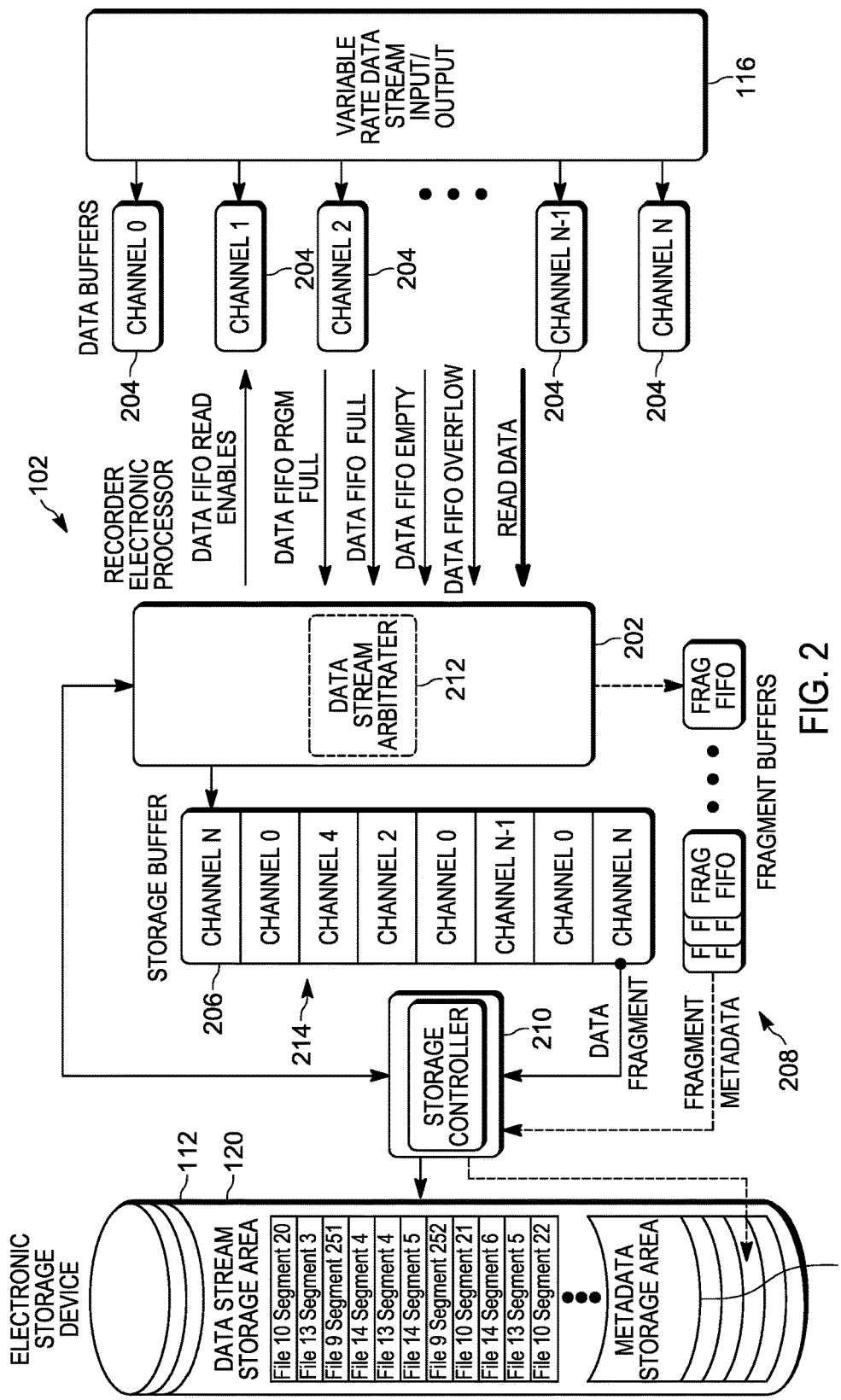
FIG. 2 is a diagram of the multi-stream recording and playback device of FIG. 1, in accordance with some embodiments.

FIG. 2 is a diagram of an example multi-stream recording and playback device 102. In the embodiment illustrated, the multi-stream recording and playback device 102 includes an electronic processor 202, a plurality of data buffers 204, a storage buffer 206, a plurality of fragment buffers 208, and a storage controller 210. The illustrated components of FIG. 2, along with other various modules and components are coupled to each other by or through one or more control or data buses that enable communication therebetween. In some embodiments, the multi-stream recording and playback device 102 is implemented on a field programmable gate array (FPGA) or another suitable customized electronic controller or control device.

In some embodiments, the electronic processor 202 is a configurable logic block of a field programmable gate array, configured to operate as described herein. The electronic processor 202 implements a data stream arbitrator 212, which operates, as described in detail below, to read data fragments from the data buffers 204 and write data fragments to the storage buffer 206.

In some embodiments, the plurality of data buffers 204, the storage buffer 206, and the plurality of fragment buffers 208 are implemented as first in, first out (FIFO) queues in a memory (not shown) of the multi-stream recording and playback device 102. The multi-stream recording and playback device 102 includes one data buffer 204 for each data stream it receives for recording. As data streams are received (for example, via the variable rate data input/output ports 116), the data received is stored in the data buffer 204 corresponding to the data stream.

The storage buffer 206 stores a plurality of data fragments 214, which have been selected from the plurality of data buffers 204. The electronic processor 202 controls the storage controller 210 to write data fragments from plurality of data fragments 214 to the electronic storage device 112. The plurality of fragment buffers 208 stores metadata defining the plurality of data fragments 214 to the plurality of fragment buffers 208. In some embodiments, the multi-stream recording and playback device 102 includes a single fragment buffer 208. In some embodiments, the multi-stream recording and playback device 102 includes one fragment buffer 208 for each data buffer 204, with each of the fragment buffers corresponding to a data buffer. The electronic processor 202 controls the storage controller 210 to write metadata from plurality of fragment buffers 208 to the electronic storage device 112. As described in detail below, the electronic processor 202 writes the metadata infrequently, as compared to the writing of the plurality of data fragments 214.

The storage controller 210 interfaces with the electronic storage device 112 to read and write data to and from the electronic storage device 112. In some embodiments, the storage controller 210 is a SATA controller.

Figure 3:
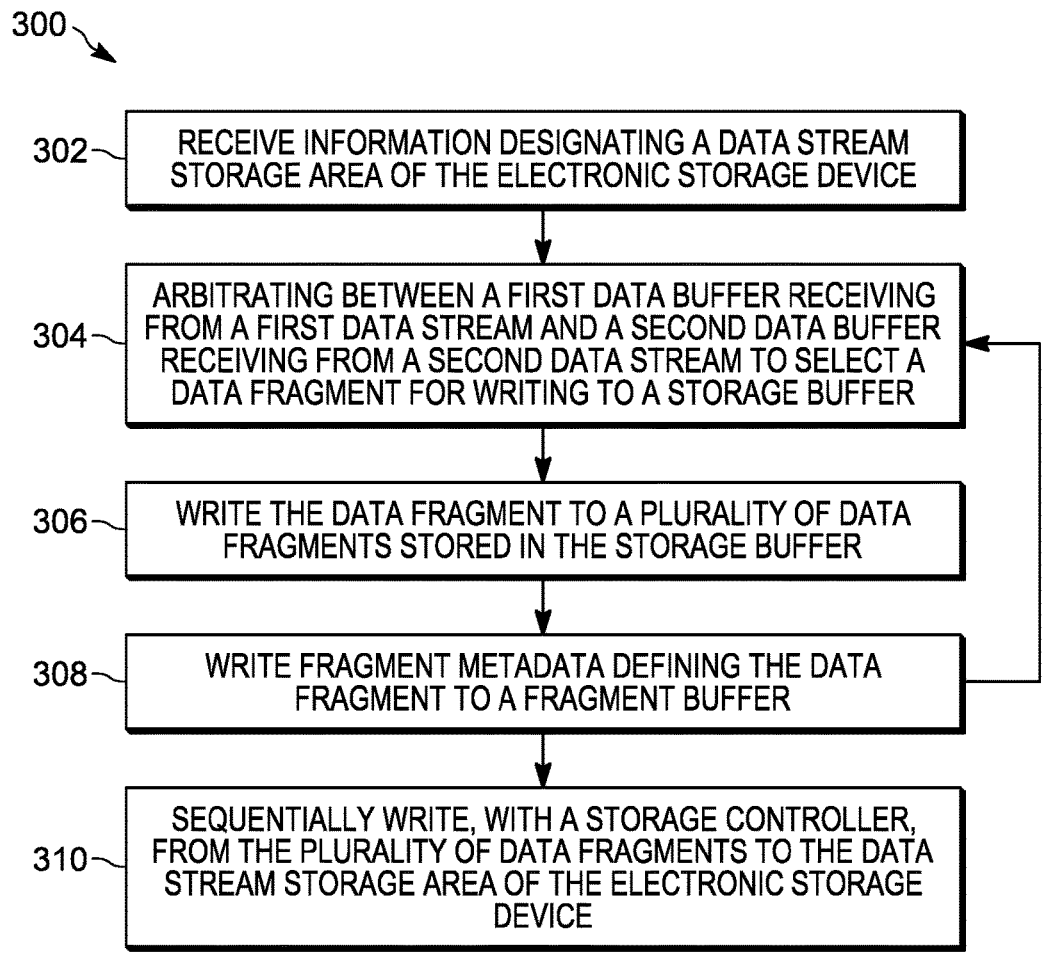
FIG. 3 is a flowchart of a method for recording multiple data streams, in accordance with some embodiments.

FIG. 3 illustrates an example method 300 for recording and playback of multiple variable rate data streams. The method 300 is described with respect to FIGS. 1 and 2. The method 300 is described as being performed by the multi-stream recording and playback device 102 and, in particular, the electronic processor 202. The method 300 is described in terms of receiving two data streams. However, the methods described herein are applicable to receiving and recording more than two data streams.

At block 302, the electronic processor 202 receives information designating the data stream storage area 120 of the electronic storage device 112. In some embodiments, this information is received from the electronic processor 104, for example, by placing the information in a register memory of the multi-stream recording and playback device 102. As noted above, prior to data storage, the electronic processor 104 performs a survey of the electronic storage device 112. In some embodiments, the electronic processor 202 also receives information designating the metadata storage area 122 and the file system definition area 124 of the electronic storage device 112.

As noted above, data streams are received and stored in the plurality of data buffers 204, with each of the data buffers 204 storing a designated data stream. As the data streams are received, the data buffers 204 begin to fill. The method steps that follow are described in terms of two data streams (a first data stream and a second data stream) received by two of the data buffers 204 (a first data buffer and a second data buffer), respectively. Alternative embodiments are configured to receive three or more data streams. As the data buffers 204 begin to fill, the electronic processor 202 pulls data from the data buffers 204, and writes the data to the storage buffer 206, as described below.

At block 304, the electronic processor 202 arbitrates between a first data buffer receiving from a first data stream and a second data buffer receiving from a second data stream to select a data fragment for writing to the storage buffer 206. In some embodiments, the electronic processor 202 arbitrates based on priority. In one embodiment, the electronic processor 202 determines a data rate for the first data stream and determines a data rate for the second data stream. The electronic processor 202 then determines a current usage for the first data buffer and a current usage for the second data buffer. The current usage is a measure of how full the data respective data buffer is. For each data buffer in use, the electronic processor 202 determines a priority value. The priority value is based on the data rate, the current usage, and a total capacity of the data buffer. The priority value represents the number of data reads which can be performed before the data buffer overflows. The lower the number of data reads, the higher the priority. For example, a data buffer that has a low current usage and a low data rate is assigned a lower priority, because it is not likely to overflow while other data buffers are being serviced. Likewise, a data buffer that has a high current usage and a high data rate is assigned a high priority, to prevent overflow. The electronic processor 202 compares the priority values of the data buffers to determine the data buffer having the highest priority, and selects the data fragment from that data buffer.

At block 306, the electronic processor 202 writes the selected data fragment to the storage buffer 206. For example, the electronic processor 202 adds the selected data fragment to the plurality of data fragments 214.

At block 308, the electronic processor 202 writes fragment metadata defining the data fragment to a fragment buffer 208. As noted above, some embodiments include a fragment buffer 208 for each data buffer 204. The fragment metadata is used to describe the data fragment and where it is located on the electronic storage device 112. Metadata includes a block location on the electronic storage device and a size for the data fragment. In some embodiments, the metadata includes a skip count. The skip count indicates lost bytes. Data loss or loss of bytes may occur when the electronic storage device 112 is unable to write all the data presented. In some embodiments, the metadata includes an end of stream indicator, which is used to indicate that the data fragment is the last data fragment in that data stream.

In some embodiments, the electronic processor 202 periodically writes the fragment metadata from the fragment buffer 208 to the metadata storage area 122 of the electronic storage device 112. In some embodiments, the electronic processor 202 monitors the usage of the fragment buffer. When the usage of the fragment buffer exceeds a threshold, the electronic processor 202 controls the storage controller 210 to write a portion of the fragment metadata from the fragment buffer 208 to the metadata storage area 122 of the electronic storage device 112. In some embodiments, the electronic processor 202 arbitrates between multiple fragment buffers 208, as described above with respect to the data buffers 204.

Fragment metadata is written periodically to allow the electronic processor 202 to spend most of its time writing the data from the storage buffer 206, allowing for large sequential writes and improved throughput.

At block 310, the electronic processor 202 sequentially writes, with the storage controller 210, from the plurality of data fragments 214 to the data stream storage area 120 of the electronic storage device 112.

As illustrated in FIG. 3, the electronic processor 202 continues filling the storage buffer 206 from the data buffers 204 (at blocks 304 and 306), and creating the corresponding metadata (at block 308) while it writes from the storage buffer 206 to the electronic storage device 312 (at block 310). The electronic processor 202 continues sequentially writing from the plurality of data fragments 214 to the data stream storage area 120 of the electronic storage device 112 until the storage buffer 206 is empty, or until it receives a signal to stop (for example, from the electronic processor 104).

In some embodiments, when the data recording is completed, a file system is created. In some embodiments, the electronic processor 202 receives an indication to stop writing data to the electronic storage device 112. For example, the electronic processor 202 may determine that both the first and second data buffers are empty. In response to receiving the indication to stop writing data to the electronic storage device 112, the electronic processor 202 controls the storage controller 210 to flush the fragment metadata from the fragment buffer 208 to the metadata storage area 122 of the electronic storage device 112. After the fragment buffer 208 is flushed, the electronic processor 202 initiates a file system generation process in the file system definition area of the electronic storage device 112. For example, the electronic processor 202 may issue a notification to the electronic processor 104 indicating that data recording is complete.

In response, the electronic processor 104 controls the multiplexer 110 to connect the electronic storage device 112 to the electronic processor 104. The electronic processor 104 then generates the file system based on the fragment metadata and the plurality of data fragments 214. For example, the location and data size for the data fragments in the metadata is used to create the directories, pointers, filenames, and other structures used by the file system to allow operating systems to access the data streams as if they were conventional files on the electronic storage device 112.

In some embodiments, the system 100 is configured to playback the data streams. Playback of the data streams is accomplished by using the fragment metadata to retrieve the data streams from the electronic storage device 112, and write them in their respective data buffers 204, for playback via the variable rate data input/output ports 116. For example, to playback the data streams recorded above using the method 300, the electronic processor 202 receives a data stream playback command (for example, from the electronic processor 104). In response to receiving the data stream playback command, the electronic processor retrieves the fragment metadata from the electronic storage device 112. The electronic processor 202 retrieves, from a first portion of the data stream storage area 120 of the electronic storage device 112 designated in the fragment metadata, a first subset of the plurality of data fragments 214 corresponding to the first data stream. The electronic processor 202 retrieves, from a second portion of the data stream storage area 120 of the electronic storage device 112 designated in the fragment metadata, a second subset of the plurality of data fragments 214 corresponding to the second data stream. The electronic processor 202 writes the first subset of the plurality of data fragments to the first data buffer and writes the second subset of the plurality of data fragments to the second data buffer.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic device for recording multiple data streams, the device comprising:
    a storage controller coupled to an electronic storage device;
    a first data buffer storing data received from a first data stream;
    a second data buffer storing data received from a second data stream;
    a fragment buffer storing fragment metadata;
    a storage buffer including a plurality of data fragments; and
    an electronic processor communicatively coupled to the storage controller, the first data buffer, the second data buffer, the fragment buffer, and the storage buffer, and configured to
    receive information designating a data stream storage area of the electronic storage device,
    for each of the first and second the data buffers, determining a priority value based on a data rate, a current usage, and a total capacity;
    arbitrate between the first data buffer and the second data buffer, based on the priority values, to select a data fragment for writing to the storage buffer,
    write the data fragment to the storage buffer,
    write fragment metadata defining the data fragment to the fragment buffer, and
    control the storage controller to sequentially write from the plurality of data fragments of the storage buffer to the data stream storage area of the electronic storage device.

2. The electronic device for recording multiple data streams of claim 1, wherein the electronic processor is further configured to arbitrate between the first data buffer and the second data buffer to select a data fragment by
    comparing the priority values to determine the data buffer having the highest priority.

3. The electronic device for recording multiple data streams of claim 1, wherein the electronic processor is further configured to
    receive information designating a metadata storage area of the electronic storage device,
    monitor a usage of the fragment buffer, and
    when the usage of the fragment buffer exceeds a threshold, control the storage controller to write a portion of the fragment metadata from the fragment buffer to the metadata storage area of the electronic storage device.

4. The electronic device for recording multiple data streams of claim 3, wherein the electronic processor is further configured to
    receive an indication to stop writing data to the electronic storage device, and
    in response to receiving the indication,
    control the storage controller to flush the fragment metadata from the fragment buffer to the metadata storage area of the electronic storage device, and
    initiate a file system generation process in a file system definition area of the electronic storage device based on the fragment metadata and the plurality of data fragments.

5. The electronic device for recording multiple data streams of claim 4, wherein the electronic processor is further configured to receive an indication to stop writing data to the electronic storage device by determining that both the first and second data buffers are empty.

6. The electronic device for recording multiple data streams of claim 1, further comprising:
    a second fragment buffer communicatively coupled to the electronic processor,
    wherein the electronic processor is further configured to
        write fragment metadata defining the data fragment to the fragment buffer when the data fragment is selected from the first data buffer, and
        write fragment metadata defining the data fragment to the second fragment buffer when the data fragment is selected from the second data buffer.

7. The electronic device for recording multiple data streams of claim 1, further comprising:
    a memory,
    wherein the first data buffer, the second data buffer, the fragment buffer, and the storage buffer are first in, first out queues implemented in the memory.

8. The electronic device for recording multiple data streams of claim 1, wherein the first data stream and the second data stream are each one selected from the group consisting of a radiofrequency data stream, a video data stream, an audio data stream, and a keystroke data stream.

9. The electronic device for recording multiple data streams of claim 1, wherein the fragment metadata defining the data fragment includes at least one selected from the group consisting of a block location on the electronic storage device, a size for the data fragment, a skip count indicating lost bytes, and an end of stream indicator.

10. The electronic device for recording multiple data streams of claim 1, wherein the electronic processor is further configured to
receive a data stream playback command; and
in response to receiving the data stream playback command,
retrieve the fragment metadata from the electronic storage device,
retrieve, from a first portion of the data stream storage area of the electronic storage device designated in the fragment metadata, a first subset of the plurality of data fragments corresponding to the first data stream,
retrieve, from a second portion of the data stream storage area of the electronic storage device designated in the fragment metadata, a second subset of the plurality of data fragments corresponding to the second data stream,
write the first subset of the plurality of data fragments to the first data buffer, and
write the second subset of the plurality of data fragments to the second data buffer.

11. A method for recording multiple data streams, the method comprising:
receiving, with an electronic processor, information designating a data stream storage area of an electronic storage device,
for each of the first and second the data buffers, determining a priority value based on a data rate, a current usage, and a total capacity;
arbitrating between a first data buffer receiving from a first data stream and a second data buffer receiving from a second data stream, based on the priority values, to select a data fragment for writing to a storage buffer,
writing the data fragment to a plurality of data fragments stored in the storage buffer,
writing fragment metadata defining the data fragment to a fragment buffer, and
sequentially writing, with a storage controller, from the plurality of data fragments to the data stream storage area of the electronic storage device.

12. The method for recording multiple data streams of claim 11, wherein arbitrating between the first data buffer and the second data buffer to select a data fragment includes
comparing the priority values to determine the data buffer having the highest priority.

13. The method for recording multiple data streams of claim 11, further comprising:
receiving information designating a metadata storage area of the electronic storage device,
monitoring a usage of the fragment buffer, and
when the usage of the fragment buffer exceeds a threshold, controlling the storage controller to write a portion of the fragment metadata from the fragment buffer to the metadata storage area of the electronic storage device.

14. The method for recording multiple data streams of claim 13, further comprising:
receive an indication to stop writing data to the electronic storage device, and
in response to receiving the indication to stop writing data to the electronic storage device,
control the storage controller to flush the fragment metadata from the fragment buffer to the metadata storage area of the electronic storage device, and
initiate a file system generation process in a file system definition area of the electronic storage device based on the fragment metadata and the plurality of data fragments.

15. The method for recording multiple data streams of claim 14, wherein receiving an indication to stop writing data to the electronic storage device includes determining that both the first and second data buffers are empty.

16. The method for recording multiple data streams of claim 11, further comprising:
writing fragment metadata defining the data fragment to the fragment buffer when the data fragment is selected from the first data buffer, and
write fragment metadata defining the data fragment to a second fragment buffer when the data fragment is selected from the second data buffer.

17. The method for recording multiple data streams of claim 11, wherein writing fragment metadata defining the data fragment to the fragment buffer includes writing at least one selected from the group consisting of a block location on the electronic storage device, a size for the data fragment, a skip count indicating lost bytes, and an end of stream indicator.

18. The method for recording multiple data streams of claim 11, further comprising:
receiving a data stream playback command; and
in response to receiving the data stream playback command,
retrieving the fragment metadata from the electronic storage device,
retrieving, from a first portion of the data stream storage area of the electronic storage device designated in the fragment metadata, a first subset of the plurality of data fragments corresponding to the first data stream,
retrieving, from a second portion of the data stream storage area of the electronic storage device designated in the fragment metadata, a second subset of the plurality of data fragments corresponding to the second data stream,
writing the first subset of the plurality of data fragments to the first data buffer, and
writing the second subset of the plurality of data fragments to the second data buffer.

* * * * *